United States Patent [19]

Kuwagaki et al.

[11] 4,310,220
[45] Jan. 12, 1982

[54] ELECTROCHROMIC DISPLAY WITH ONE POROUS SEPARATOR

[75] Inventors: Hiroshi Kuwagaki, Joyo; Hiroaki Kato, Tenri; Sadatoshi Takechi, Nara; Hiroshi Nakauchi; Yasuhiko Inami, both of Tenri, all of Japan

[73] Assignee: Sharp Kabushiki Kaisha, Osaka, Japan

[21] Appl. No.: 54,918

[22] Filed: Jul. 5, 1979

Related U.S. Application Data

[63] Continuation of Ser. No. 871,618, Jan. 23, 1978, abandoned.

[30] Foreign Application Priority Data

Jan. 24, 1977 [JP] Japan .................................. 52-7116
Jan. 24, 1977 [JP] Japan .................................. 52-7117
Jan. 24, 1977 [JP] Japan .................................. 52-7118
Sep. 6, 1977 [JP] Japan .................................. 52-107426

[51] Int. Cl.$^3$ .............................................. G02F 1/17
[52] U.S. Cl. ................................................... 350/357
[58] Field of Search ............................. 350/357, 334

[56] References Cited

U.S. PATENT DOCUMENTS 4,021,100  5/1977  Giglia ................................. 350/357
4,067,644  1/1978  Dlouhy et al. ..................... 350/357

FOREIGN PATENT DOCUMENTS 2406624  9/1974  Fed. Rep. of Germany ...... 350/357

*Primary Examiner*—James W. Davie
*Attorney, Agent, or Firm*—Birch, Stewart, Kolasch and Birch

[57] ABSTRACT

A porous separator is provided with an electrochromic display for containing an electrolyte, whereby a display electrode is continuously, electrically rotated to a counter electrode through the electrolyte. A filter separator is further provided together with the porous separator for urging the porous separator toward the display electrode and itself toward the counter electrode because of the elastic characteristic thereof. The filter separator can also contain the electrolyte. The porous separator provides a white background for the display electrode. The remaining electrolyte, except for the electrolyte in both the porous and the filter separators, is eliminated from the electrochromic display to provide a cavity within the electrolyte for cancelling the cubic expansion of the electrolyte when temperature rises. This cubic expansion cancelling cavity may be formed by injecting a bubble into the electrolyte. The cavity is settled at a fixed position by the provision of an electrolyte-impregnated separator means without any interference with the display and counter electrodes.

25 Claims, 13 Drawing Figures

PRIOR ART

ELECTROCHROMIC DISPLAY WITH ONE POROUS SEPARATOR

This application is a continuation of copending application Ser. No. 871,618, filed on Jan. 23, 1978, now abandoned.

BACKGROUND OF THE INVENTION

The present invention relates generally to electro-optical displays of the type using electrochromic material (referred to as "ECD" hereinafter) which undergoes reversible color changes upon the application of an electric field. More particularly the present invention relates to an improved sandwich construction for an electrochromic display.

The conventional electrochromic display comprises a first glass substrate with one or more transparent electrodes and electrochromic layers thereon, a second glass substrate with a counter electrode, a seal member, and an electrolyte filled therebetween. The electrolyte has a tendency to damage the glass substrates of the ECD cell in response to a high temperature applied to the ECD cell because the cubic expansion of the electrolyte is much greater than that of the glass substrates. To avoid the above destruction of the ECD cell, the present inventors have proposed an improved ECD, wherein a bubble comprising an atmosphere or gas is introduced into the electrolyte of the ECD cell to thereby cancel the cubic expansion of the electrolyte. The bubble is selected such that its volume is larger than the cubic expansion of the electrolyte.

However, the bubble tends to freely shift or move within the ECD cell. The optical characteristics of the ECD when the bubble attaches to either the electrochromic layers or the counter electrode since electrochemical reactions near the electrochromic layer and the counter electrode are prevented because of the near proximity of the disagreeably settled bubble to the electrochromic layer and counter electrode. When the bubble comes into contact with the first glass substrate, the optical indication characteristics of the ECD is also lowered because a white background included in the electrolyte becomes non-uniform because of by the bubble.

A porous film of pigment solidified with adhesive is disclosed in U.S. Pat. Nos. 3,892,492 and 3,994,333. The porous film functions to provide a background for a visual display and hides the counter electrode. However, the electrolyte is continuously filled within the ECD cell and the remaining electrolyte, except for that which is contained in the porous film, is not eliminated from the cavity.

OBJECTS AND SUMMARY OF THE INVENTION

Accordingly, an object of the present invention is to provide an improved ECD of the type using a liquid electrolyte which provides improved resistance to the effects of a temperature change.

Another object of the present invention is to provide an improved ECD with an improvement for providing contrasting background to images.

Still another object of the present invention is to provide an improved ECD which enhances reliability, optical indications, and is suitable for mass productions.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to embodiment of the present invention, a porous layer is disposed in contact with the electrochromic layer over an image region including the electrochromic layer as a display electrode. The porous layer can contain the electrolyte and provide a background such as a white background for the electrochromic layer while a electrochromic layer is colored. A filter member is further provided between the porous layer and the counter electrode for also containing the electrolyte and overlaying the counter electrode. The filter member can urge the porous layer toward the electrochromic layer and itself toward the counter electrode, respectively, because the filter member is sufficiently elastic.

The electrochromic layer and the counter electrode are combined with the electrolyte included within the porous layer and the filter member and, only the electrolyte which is impregnated within the porous layer and the filter member are employed for implementing the electrochromic phenomena.

A desirable cavity is formed between the porous layer and the filter member, and the body of the ECD cell, wherein a bubble of atmosphere or inert gas exists.

In a preferred form, only one filter member can be disposed between the electrochromic layer and the counter electrode with addition of the porous layer.

In another preferred form, two filter members can be provided on the electrochromic layer and the counter electrode, respectively, and the porous layer can be sandwiched therebetween.

In another embodiment of the present invention, a bubble is introduced into the electrolyte for cancelling the cubic expansion of the electrolyte. The porous layer is provided between the display electrode and the counter electrode for suppressing the movement of the bubble. The porous layer overlays the display region including the display electrode. The electrochromic phenomena occurs through the use of the electrolyte included within the porous layer. The filter member can be disposed between the porous layer and the counter electrode. The bubble is prevented from approaching either or both of the display and the counter electrodes by the provision of the porous layer and the filter member. The bubble contains the atmosphere or an inert gas.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Preliminary to a detailed discussion of this invention in general, it may be advantageous to outline the structure of a conventional ECD cell.

Figure 1:
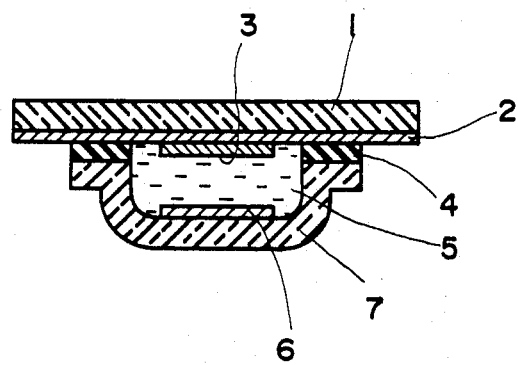
FIG. 1 is a cross sectional view of a basic construction of a conventional ECD.

Referring now to FIG. 1 of the drawings, a conventional ECD comprises a flat glass substrate 1 which has both an indium oxide transparent electrode 2 and an electrochromic layer 3 such as tungsten oxide ($WO_3$) which undergoes reversible color changes upon the application of an electric field.

A display electrode includes the combination of the indium oxide transparent electrode 2 and the electrochromic layer 3. A dish shaped glass substrate 7 is provided, where a counter electrode 6 is formed thereon. A seal means 4 is provided for bonding the flat glass substrate 1 and the dish shaped glass substrate 7 with each other. An electrolyte 5 is filled within the ECD cell and is surrounded by the flat glass substrate 1 and the dish shaped glass substrate 7. The electrolyte 5 is a mixture of sulfuric acid, an organic alcohol such as glycerol, and a fine white powder such as $TiO_2$.

Figure 2:
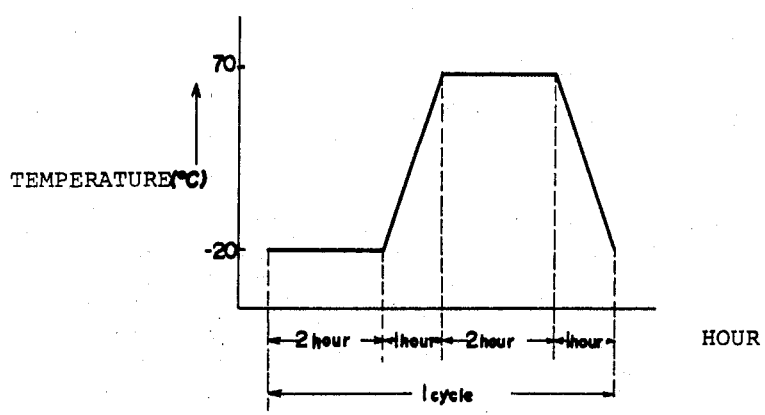
FIG. 2 is a temperature diagram applied to the conventional ECD.

FIG. 2 shows a temperature chart applied to the ECD shown in FIG. 1. A temperature change described in FIG. 2 can be sometimes experienced in tropical environments and in a test cycle for checking a package of the ECD in a short time. The horizontal axis of the chart of FIG. 2 shows an hour dimension and the vertical axis thereof is a temperature dimension. The humidity is selected to be ninety (90)% at the room temperature. The above-mentioned ECD was examined after application of forty (40) cycles of the temperature change shown in FIG. 2 when disposed within a thermo-hygrostat.

Under the circumstances, the ECD was definitely damaged even after one (1) cycle of the temperature change, that is, both the flat glass substrate 1 and the dish shaped glass substrate 7 were cracked or destroyed, whereby the electrolyte 5 flowed out of the ECD cell.

It is noted that the following are the reasons for the damage to the ECD. The ECD can not tolerate a cubic expansion rate of the electrolyte which is about one hundred (100) times that of the glass material, the electrolyte being completely filled within a compartment of the ECD cell at a temperature approximating room temperature. In view of the cubic expansion of the electrolyte, the resultant internal pressure within the ECD cell would eventually destroy the glass substrates 1 and 7 of the ECD cell.

The internal pressure with a rise in temperature is generally estimated as follows. The volume of the ECD cell is assumed 5.5 cm × 2.5 cm × 0.1 cm. The electrolyte 5 is also assumed to be a mixture of sulfuric acid and glycerol. The internal pressure $P_{70}$ at seventy degrees (70° C.) of the ECD cell is calculated under the condition that the electrolyte 5 is injected into the cavity of the ECD cell at twenty degrees (20° C.).

The volume $V_{20}$ of electrolyte 5 at the twenty degrees (20° C.) is:

$$V_{20} = 5.5 \times 2.5 \times 0.1 = 1.38 \text{ (cm}^3\text{)}$$

The cubic expansion rate $\Delta V_{70}$ of the electrolyte 5 at seventy degree (70° C.) rather than at the twenty degree (20° C.) is:

$$\Delta V_{70} = \beta V \Delta T$$

where $\beta$ (cubic expansion ratio of the glycerol)
$\beta = 0.47 \times 10^{-3}$ (1/°C.)
$\Delta T$ (the temperature change)
$\Delta T = 70 - 20 = 50$ (C.°)
Therefore, the cubic expansion rate is $\Delta V_{70} = 0.032$ (cm$^3$). The volume $V_{70}$ of the electrolyte 5 at seventy degrees (70° C.) is.

$$V_{70} = V_{20} + \Delta V_{70} = 1.41 \text{ (cm}^3\text{)}$$

The cubic expansion of the glass substrates 1 and 7 of the ECD cell is negligible in comparison with that of the electrolyte 5. The internal pressure $P_{70}$ at seventy degrees (70° C.) is:

$$P_{70} = (V_{70} - V_{20}/KV_{70}) + P_{20}$$

wherein K (compressibility of the glycerol) is $$K = 2.2 \times 10^{-6} \text{ (atm}^{-1}\text{)}$$

The internal pressure $P_{20}$ at the twenty degrees (20° C.) is one (1) (atm) and the internal pressure $P_{70} = 1032.6$ (atm) = 1063.5 (kg/cm$^2$).

On the other hand, a glass material can generally tolerate a pressure of about 500 kg/cm$^2$ (mean value). It is noted that the glass substrates 1 and 7 must be damaged by the cubic expansion of the electrolyte 5 in accordance with its rising temperature.

Figure 3:
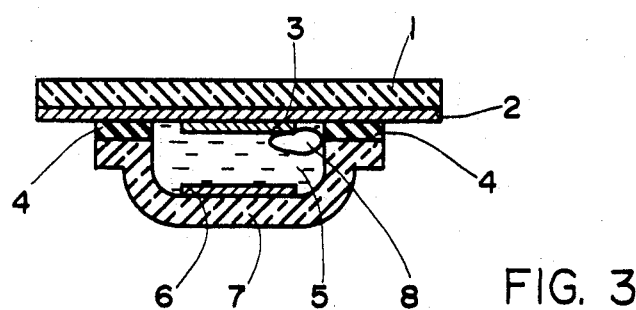
FIG. 3 is a cross sectional view of a construction of a prior art ECD.

The present inventors have investigated a prior art ECD of FIG. 3 and can eliminate the damage of the ECD by cubic expansion of the electrolyte 5. Like elements corresponding to those of FIG. 1 are indicated by like numerals in FIG. 3. A bubble 8 of or inert gas is provided within the electrolyte 5 for reducing the rising of the internal pressure by means of the electrolyte 5. The volume of the bubble 8 is selected larger than the cubic expansion rate $\Delta V_{70}$.

However, the bubble 8 tends to move freely in the cavity in accordance with position of the ECD cell. The visual indications of the ECD are deteriorated by attachment of the bubble 8 onto either the electrochromic layer 3 or the counter electrode 6 because electrochemical reactions about the layer 3 and the electrode 6 are considerably prevented by the bubble 8. When the bubble comes into contact with the flat glass substrate 1, the optical indications of the ECD are also lowered since the pigment included within the electrolyte 5 becomes nonuniform.

Figure 4:
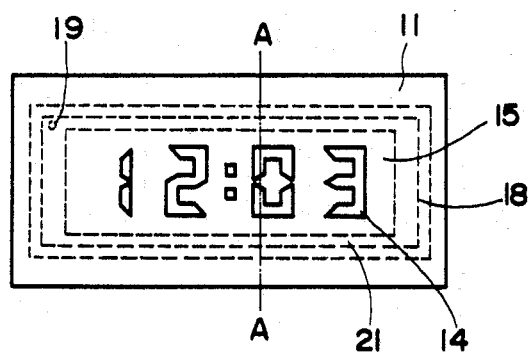
FIG. 4 is a plan view of an embodiment of an ECD of the present invention.
Figure 5:
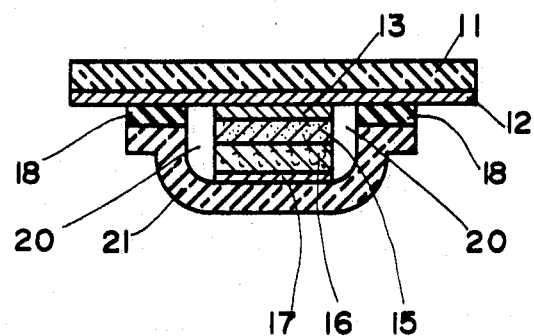
FIG. 5 is a cross sectional view of the ECD shown in FIG. 4.

An attention is directed to FIGS. 4 and 5 which show the ECD cell of the present invention. FIGS. 4 and 5 illustrate the ECD in a plan view and a cross sectional view taken on line A—A in FIG. 4, respectively.

The ECD of the present invention comprises a flat glass substrate 11, a conductive, transparent electrode 12 such as indium oxide ($InO_2$) thereon, an electrochromic layer 13 which comprises a preferred electrochromic material such as tungsten oxide (WO₃). The electrochromic layer 13 is deposited by vacuum evaporation, although other processes such as sputtering, electrochemical deposition, spray or silk screening may be available. A display electrode 14 consisting of the flat glass substrate 11, the conductive, transparent electrode 12, and the electrochromic layer 13, is patterned for indicating any desired images, for example, characters and symbols.

A counter electrode 17 made of an indium oxide transparent electrically conducting film is formed on a dish shaped glass substrate 21 for carrying out electrochromic phenomena related with the electrochromic layer 13. A seal member 18 adheres to the flat glass substrate 11 and to the dish shaped glass substrate 21 to thereby define a compartment 20 of the ECD cell. A filter member 16 is further provided which is sandwiched by the porous means 15 and the counter electrode 16. An injection hole 19 is formed at the periphery, or, the raised portion of the dish shaped glass substrate 21.

A porous means 15 is attached directly to the electrochromic layer 13 to overlay the same. The porous means 15 is selected to be a porous and white plate such as a porous ceramic plate comprising cordierite (2MgO.2Al₂O₃.5SiO₂), milute (3Al₂O₃.2SiO₂) and alumina (Al₂O₃) etc. Another material suitable for the porous means 15 is a porous and white organic film selected from the group consisting of tetrafluorcethylne polymer, fluorinatedethylene-propylene copolymer, and propylene polymer. Still another material suitable for the porous means 15 is the porous and white organic film which is enhanced in the white background thereof by impregnation of a white pigment of such as alumina (Al₂O₃), titanium dioxide (TiO₂), barium sulfate (BaSO₄) into the porous and white organic film comprising the above materials.

Table 1 sets forth the above discussed characteristics of the ECD.

of porosity above thirty seven (37)% and the thickness below point nine (0.9) mm.

The filter member 16 is further provided to contain the electrolyte which is injected within the ECD cell and overlaying the counter electrode 17 by means of the electrolyte. The filter member 16 can also stress the porous means 15 toward the electrochromic layer 13 and the filter member is itself stressed toward the counter electrode 17, because the filter member 16 is itself elastic. In view of the porous means 15 and the filter member 16, the electrochromic layer 13 is electrically related to the counter electrode 17 through the electrolyte impregnated within the porous means 15 and the filter member 16. The filter member 16 may comprise asbestos, glass fibre, Polyfrone paper (commercial name), non-waven fabric or a mat of olefin such as polypropylene, or a porous gum plate etc.

Both the porous means 15 and the filter member 16 are separated from the seal member 18 and the injection hole 19 to thereby define a cavity 20 surrounding the porous means and the filter member The seal member 18 and the injection hole 19 are not in contact with the electrolyte included within the porous means 15 and the filter member 16 and, therefore, they are not damaged by the electrolyte. Although the cavity 20 can be formed entirely around the porous means 15 and the filter member 16 to enhance the reliability of the seal member 18 and the injection hole 19, it is not always necessary to compose such structure, because the cavity 20 which is disposed at a portion around the porous means 15 and the filter member 16 can cancel the cubic expansion of the electrolyte with rising temperature. Since the porous means 15 and the filter member 16 both contain the electrolyte, the rise of the internal pressure of the ECD cell is much more restricted.

Moreover, the electrolyte is completely filled within the porous means 15 and the filter member 16 to thereby continuously cover the display electrode 14 and the

TABLE 1

| No. | porous means | symbol | manufacturer | coloration | thickness (mm) | ratio of porosity (%) | grain size (μ) | reflection factor (%) 590nm | electric conductivity (Ω cm⁻¹) |
|---|---|---|---|---|---|---|---|---|---|
| 1 | porous ceramics plate | c-1 | Nippon Toki Co. | white | 0.95 | 37 | 1-3 | 55 | $5.6 \times 10^{-3}$ |
| 2 | porous ceramics plate | c-1-3 | Nippon Toki Co. | white | 0.5 | 36 | 1-3 | 58 | $7.6 \times 10^{-3}$ |
| 3 | porous ceramics plate | c-1-4 | Nippon Toki Co. | white | 0.4 | 36 | 1-3 | 55 | $7.2 \times 10^{-3}$ |
| 4 | porous ceramics plate | c-3 | Nippon Toki Co. | white | 0.5 | 49 | 4- | 58 | $7.6 \times 10^{-3}$ |
| 5 | porous and white organic film | No. 2 | Sumitomo Electric Co. | white | 0.43 | 70 | — | 46 | $7.8 \times 10^{-3}$ |

The specific electric conductivity was measured under the porous means 15 disposed between the display electrode 14 and the counter electrode 17 of the ECD cell, wherein an electrolyte having the specific electric conductivity of $9.88 \times 10^{-3}$ ($\sigma \cdot cm^{-1}$) was utilized. All of the above structured ECDs showed good characteristics in its operation modes, indication conditions, and reliability thereof. In our experiences, the porous ceramics plate should preferably be selected with a ratio counter electrode 17 even when the ECD cell are vibrated, whereby the performance characteristics of the ECD cell can be highly enhanced. The electrolyte will not drain from the cell ECD cell is split, since the electrolyte is completely held within the porous means 15 and the filter member 16.

EXAMPLE 1

With reference to FIGS. 4 and 5, a typical example of the above mentioned embodiment of the present invention is described as follows.

The dish shaped glass substrate 21 rises above the substrate 11 by approximately 1 mm in height the counter electrode 17 thereon. The seal member 18 comprising Araldite AV 138J/HV998 (commercial name) of epoxyadhesives manufactured by CIBA-GEIGY is coated at the frame of the dish shaped glass substrate 21. The display electrode 14 comprises the flat glass substrate 11, the conductive, transparent electrode 12 made of $InO_2$, and the electrochromic layer 13 made of $WO_3$. The seal member 18 adheres to the flat glass substrate 11 and to the dish shaped glass substrate 21 after positioning the porous means 15 and the filter member 16 therein. The porous means 15 is the porous ceramic plate C-3 of Table 1 and the filter member 16 is the glass fibre filter GA-100 by TOYO KAGAKU INDUSTRIES Co.

The ECD cell is heated at one hundred twenty degrees (120° C.) under pressure of ten (10) $kg/cm^2$ for one (1) hour to cement the seal member 18. The electrolyte comprises carbitol acetate solution of 1.0 molar lithum perchlorate.

The injection hole 19 is soaked in the electrolyte under the lowered pressure of point one (0.1) torr and, thereafter, to atmospheric pressure. Therefore, the electrolyte is impregnated entirely within the ECD cell under pressure. The ECD cell is subjected to the lowered pressure again to keep the remaining electrolyte out of the cell, the remaining electrolyte being not contained within the porous means 1 and the filter member 16. By means of the above processes, the cavity 20 is formed within the ECD cell, the cavity being filled with the atmosphere or a desired inert gas. The porous means 15 and the filter member 16 contain the electrolyte at point eight (0.8) through point nine (0.9) $g/cm^3$ on the volume of the ECD cell as described above. The injection hole 19 is blocked by silicon resin KE 47-RTV manufactured by SYINETSU CHEMICAL Co.

After manufactured by the above processes, the ECD cell is examined in accordance with the temperature environments shown in FIG. 2. The ECD cell maintained the display characteristics upon review of the above examination. The electrochromic phenomena is also enhanced because the filter member 16 is elastic enough to press the porous means 15 toward the electrochromic layer 13 and to attach itself to the counter electrode 17, whereby the electrochromic layer 13 is completely electrically related to the counter electrode 17 by means of the electrolyte.

EXAMPLE 2

The ECD cell is fabricated by steps shown in EXAMPLE 1. The porous means 15 is the porous and white organic film No. 2 manufactured by SUMITOMO ELECTRIC Co. and the filter member 16 is the glass fiber filter GA-100 by TOYO KAGAKU INDUSTRIES Co.

EXAMPLE 3

Figure 6:
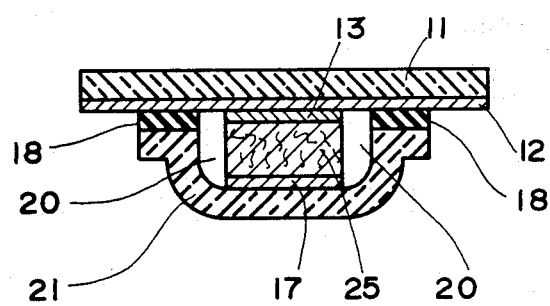
FIGS. 6 and 7 are cross sectional views of other embodiments of the ECDs of the present invention, respectively.

With reference to FIG. 6 showing the ECD of the present invention, only one filter member 25 is positioned between the electrochromic layer 13 and the counter electrode 17. The filter member 25 is elastic, porous, and white colored eliminating the necessity for the porous means 15. Such filter member 25 suitable for the ECD is Polyfron paper PF-2 manufactured by TOYO KAGAKU INDUSTRIES CO. Like elements corresponding to those of FIG. 5 are indicated by like numerals in FIG. 6.

EXAMPLE 4

Figure 7:
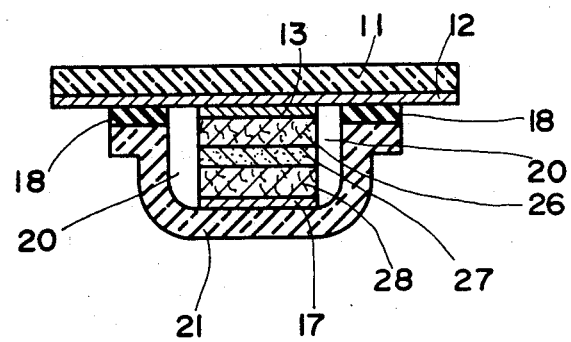

As shown in FIG. 7, the ECD cell includes the first and second filter members 26, 28 and the porous means 27 therebetween, the ECD cell being manufactured by means of steps similar to EXAMPLE 1. The first filter member 26 is elastic and transparent in the electrolyte. The glass fibre filter GA-100 fabricated by TOYO KAGAKU INDUSTRIES Co. is suitable for the first filter member 26. The porous means 27 is the porous ceramics plate C-3 by NIPPON TOKI Co. The second filter member 28 is also the glass fibre GA-100. Since the first and second filter members 26, 28 are attached to the electrochromic layer 13 and the counter electrode 17, the electrolyte is in close contact with the electrochromic layer 13 and the counter electrode 17.

Figure 8:
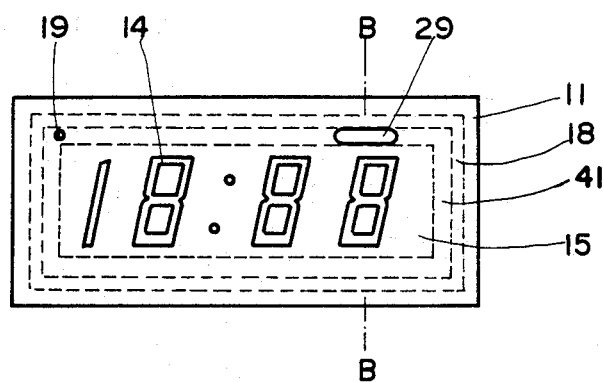
FIG. 8 is a plan view of still another embodiment of an ECD of the present invention.
Figure 9:
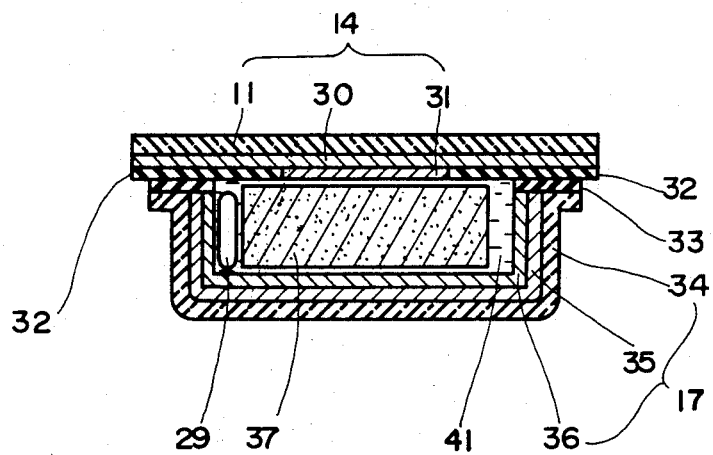
FIG. 9 is a cross sectional view of the ECD shown in FIG. 8.

FIGS. 8 and 9 illustrate another embodiment of the present invention, wherein a bubble is formed within the electrolyte and the porous means is provided for restricting free movement of the bubble. FIG. 8 shows the ECD in a plan view and FIG. 9 shows the same in a cross sectional view taken on line B—B in FIG. 8. Like elements corresponding to those of FIGS. 4, 5 are indicated by like numerals in FIGS. 8 and 9.

A ECD comprises the flat glass substrate 11, the conductive, transparent electrode 30 made of $InO_2$ thereon, the electrochromic layer 31 made of $WO_3$ thereon, all of which are included within the display electrode 14. The dish shaped glass substrate 34, the conductive, transparent electrode 35 made of $InO_2$ thereon, the electrochromic layer 36 made of $WO_3$ thereon, all of which are included within the counter electrode 17. The porous means 37 is provided between the display electrode 14 and the counter electrode 15. The seal means 33 is provided for adhering the flat glass substrate 11 to the dish shaped glass substrate 34 before completion thereof. The electrolyte 41 is impregnated within the cavity defined by the flat glass substrate 11 and the dish shaped glass substrate 34 the electrolyte being injected through the injection hole 19. An insulation film 32 is disposed on the conductive, transparent electrode 30. The bubble 29 is formed within the electrolyte 41.

The porous means 37 is equivalent to the porous means 15 described above. The porous means 37 entirely covers a display area including the display electrode 14. The electrolyte 41 is carbitol acetate solution of 1.0 molar lithium perchlorate.

The bubble 29 is disposed between the body of the ECD cell and the porous means 15. The bubble 29 functions to cancel the cubic expansion of the electrolyte 41 with rising temperature. Injection of a smaller quantity of electrolyte 41 than the amount of space defining the cavity defined by the flat glass substrate 11 and the dish shaped glass substrate 34 causes the bubble 29 to occur. The bubble 29 includes the atmosphere and is created by means of the introduction of the electrolyte 41 under the atmosphere. The desired inert gas can occupy the bubble 29 processed under the inert gas. Because of the porous means 37, the display electrode 14 is electrically related to the counter electrode 15 through the use of the electrolyte 41. The bubble 29 is continuously fixed between the dish shaped glass substrate 34 and the porous means 37 without approaching the display electrode 14 and the counter electrode 17 even when the ECD cell is vibrated.

Size of the ECD shown in FIGS. 8 and 9 is as follows: the dish shaped glass substrate 34 is 55.5 mm×23 mm×1 mm (thickness) in the inner sides thereof; the porous means 37 is 55 mm×20 mm×0.8 mm (thickness); the interval between the porous means 37 and the dish shaped glass substrate 24 is about 1 mm; and the interval between the porous means 37 and either the display electrode 14 or the counter electrode 17 is about 0.03 mm.

The bubble 29 did not approach the display electrode 14 and the counter electrode 17 under the vibration test (vibration conditions: 10-55 Hz, ±1 mm among X, Y, Z, directions, for one (1) hour) or ultrasonic wave examination. Electrical characteristics of the ECD cell are not reduced under the above structure thereof. An initial charge is required to be point nine (0.9) mC V.S., a writing voltage one point five (1.5) V when the conventional ECD shown in FIG. 1 is employed. On the other hand, the ECD cell shown in FIG. 9 requires only the initial charge of point eight (0.8) mC V.S. and the writing voltage 1.5 V.

It is not necessary that the porous means 37 is disposed completely inside the dish shaped substrate 34 forming the spacing between the outside the porous means 37 and the substrate 34. It is sufficient for the present purposes that the spacing between the porous means 37 and the dish shaped substrate 34 be provided on one or two sides of the porous means 37 only. If the indication properties of the ECD cell become obscured because of the movable bubble 29, a display window (not shown) can be provided for only indicating the display area thereby concealing the spacing interval which includes the bubble 29.

Tables 2A and 2B show other results tested with respect to the ECD cells which has the structure as shown in FIG. 9.

present invention have been conceived by the present inventors.

Further attention is now directed to FIGS. 10 through 13, wherein the still further embodiments of the ECD of the present invention are illustrated in cross sectional views. Like elements corresponding to those of FIG. 9 are illustrated by like numerals in FIGS. 10 through 13. Although in FIGS. 10 through 13, all of the porous means 37 and the filter members 38, 39 are illustrated as separate from the electrochromic layer 31 and the counter electrode 17, and from each other for illustration purposes only, it will be noted that they are in fact in close contact with each other.

Figure 10:
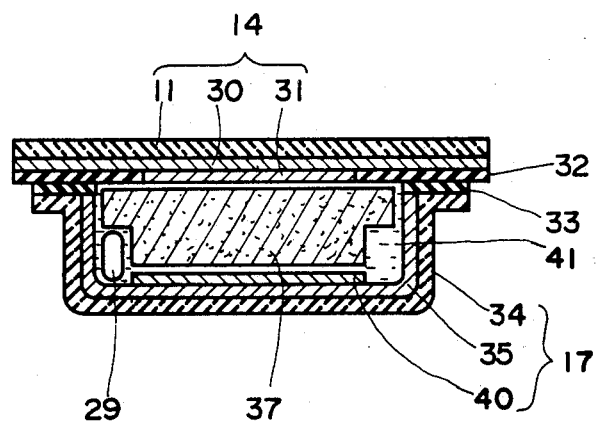
FIGS. 10 through 13 are cross sectional views of still further embodiments of the ECDs of the present invention, respectively.

With reference to FIG. 10, the ECD includes the porous means 37 disposed between the display electrode 14 and the counter electrode 17 comprising the electrically conducting film 40. The porous means 37 has a groove shaped cut in order that the bubble 29 is enclosed between the porous means 37 and the dish shaped glass substrate 34.

Figure 11:
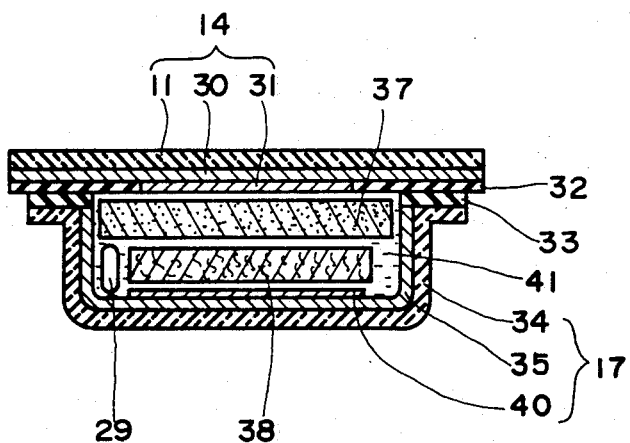

The ECD shown in FIG. 11 comprises the porous means 37 and the filter member 38 which is smaller than the porous means 37. The bubble 29 is enclosed between the porous means 37, the filter member 38, and the dish shaped glass substrate 34.

Figure 12:
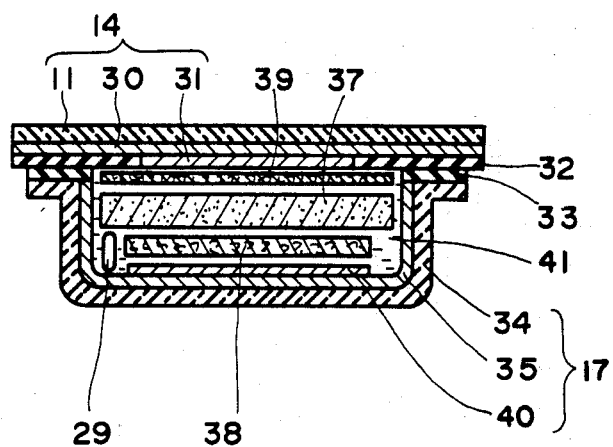

FIG. 12 shows an ECD which includes the filter member 39 positioned between the display electrode 14 and the porous means 37 with addition of the structure shown in FIG. 11. The filter member 39 turns white or transparent in the electrolyte 21. The bubble 29 is enclosed between the porous means 37, the filter member 38, and the dish shaped glass substrate 34.

Figure 13:
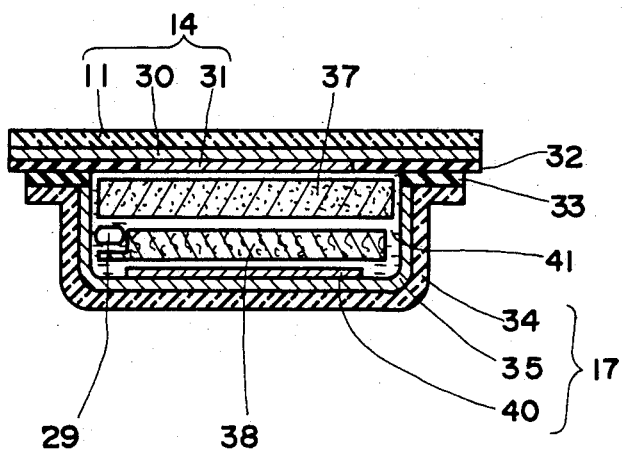

FIG. 13 shows the ECD which comprises the porous means 37 and the filter member 38. The corner portion of the filter member 38 is cut away so that the bubble 29 is positioned so as to rest between the porous means 37, the filter member 38, and the dish shaped glass substrate 34 to thereby entirely block the bubble 29.

It will be noted that another kind of ECD can be

TABLE 2A

| Electrolyte solvent | carbitol acetate | carbitol acetate | carbitol acetate | carbitol acetate |
|---|---|---|---|---|
| electrolyte | lithium perchlorate | lithium perchlorate | lithium perchlorate | lithium perchlorate |
| seal means | CIBA-GEIGY AV 138J/HV998 | CIBA-GEIGY AV 138J/HV998 | CIBA-GEIGY AV 138J/HV998 | CIBA-GEIGY AV 138J/H998 |
| characteristics | | | | |
| writing voltage (v) | 1.5 | 1.5 | 1.5 | 1.5 |
| charge (mC) | 0.6 | 0.8 | 1.0 | 1.1 |

TABLE 2B

| Electrolyte solvent | carbitol acetate | carbitol acetate | carbitol acetate | carbitol acetate |
|---|---|---|---|---|
| electrolyte | lithium perchlorate | lithium perchlorate | lithium perchlorate | lithium perchlorate |
| Seal means | CIBA-GEIGY AV138J/HV998 | AV138J/HV998 | AV138J/HV998 | AV138J/HV998 |
| Characteristics | | | | |
| writing voltage | 1.5 | 1.5 | 1.5 | 1.5 |
| charge | 0.6 | 0.8 | 1.5 | 1.5 |

In the above embodiment of the ECD shown in FIG. 9, the existence of the interval between the porous means 37 and the dish shaped glass substrate 34 makes the indication area of the ECD cell smaller. The display window is further required to conceal the spacing interval and therefore the bubble 29. To eliminate these defects, still further embodiments of the ECD of the present invention have been conceived by the present inventors.

employed with the present invention, wherein the ECD is so arranged to form an insoluble colored film on a cathode by reducing a colorless liquid through electrochemical reactions, although the above description is all directed to the ECD which employs inorganic solid film such as tungsten oxide ($WO_3$).

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display cell comprising:
    a pair of electrodes defining a first cavity therebetween;
    a layer of electrochromic material disposed between said pair of electrodes;
    separator means impregnated with a desired amount of electrolyte and disposed within said first cavity and between said pair of electrodes, said separator means defining a second and third cavity within said first cavity on opposite sides thereof; and
    said second and third cavity absorbing the cubic expansion of the electrolyte when the electrolyte is subjected to increases in temperature.

2. An electrochromic display cell, comprising:
    a first electrode means containing a layer of electrochromic material and a second electrode means containing a layer of electrochromic material said first and second electrode means defining a cavity therebetween;
    a porous separator means occupying a portion of said cavity, said porous separator means being in contact with said electrochromic layers and impregnated with a first amount of an electrolyte;
    a second amount of said electrolyte being disposed in the substantial balance of said cavity, said second amount of said electrolyte defining a bubble therein; and
    said bubble having a volume which is greater than the additional volume required to compensate for the cubic expansion rate of said second amount of said electrolyte when subjected to increases in temperature.

3. The electrochromic display cell set forth in claim 2, wherein said porous separator means is shaped along its outer periphery to provide a cut-away portion, said bubble being concealed within said cut-away portion of said porous separator means.

4. The electrochromic display cell set forth in claim 2, wherein said porous separator means comprises a material having elastic characteristics.

5. The electrochromic display cell set forth in claim 2, wherein said porous separator means comprises a filter, said filter further comprising a material selected from the group consisting of asbestos, a glass fibre, a non-woven fabric, a mat of an olefin, and a porous gum plate.

6. The electrochromic display cell set forth in claim 2, wherein said second amount of said electrolyte is not impregnated within said porous separator means.

7. An electrochromic cell set forth in claim 2, wherein said first and second electrode means comprises:
    a substrate layer;
    a transparent electrode layer disposed on said substrate layer, and said layer of electrochromic material disposed on at least a portion of said transparent electrode layer.

8. The electrochromic display cell set forth in claim 2, wherein said porous separator means comprising:
    a porous ceramic plate, said porous ceramic plate further comprising a material selected from the group consisting of cordierite, milute, alumina, and a porous or organic film, said porous and organic film further comprising a material selected from the group consisting of tetrafluoroethylene polymer, fluorinated ethylene propylene copolymer and propylene polymer, said porous and organic film having a pigment added thereto, said pigment comprising a material selected from the group consisting of alumina, titanium dioxide, and barium sulfate.

9. The electrochromic display cell set forth in claim 2, wherein said porous separator means provides a background for said display electrode.

10. An electrochromic cell set forth in claim 7, wherein said first electrode means comprises a display electrode of said electrochromic display cell, said second electrode means comprising a counter electrode of said electrochromic display cell.

11. The electrochromic display cell set forth in claim 10, further comprising a second separator means disposed between said display electrode and said porous separator means for providing a background for said display electrode, said second separator means being impregnated with a third amount of said electrolyte.

12. The electrochromic display cell set forth in claim 11, wherein said second amount of said electrolyte is not impregnated within said separator means and said second separator means.

13. The electrochromic display cell set forth in claim 11, wherein a third separator means is further provided between said display electrode and said second separator means, said third separator means being impregnated with a fourth amount of said electrolyte.

14. The electrochromic display cell set forth in claim 11, wherein said second separator means comprises:
    a filter;
    said filter further comprising a material selected from the group consisting of asbestos, a glass fiber, a non-woven fabric, a mat, an olefin, and a porous gum plate.

15. The electrochromic display cell set forth in claim 11, wherein said second separator means comprises a porous ceramic plate, said porous ceramic plate further comprising a material selected from the group consisting of cordierite, milute, alumina, or a porous and organic film, said porous and organic film further comprising a material selected from the group consisting of tetrafluoroethylene polymer, fluorinatedethylenepropylene copolymer, and propylene polymer, said porous and organic film having a pigment added thereto, said pigment comprising a material selected from the group consisting of alumina, titanium dioxide, and barium sulfate.

16. The electrochromic display cell set forth in claim 13, wherein said third separator means comprises a material having an elastic characteristic.

17. The electrochromic display cell set forth in claim 13, wherein said third separator means provides a background for the display electrode.

18. The electrochromic display cell set forth in claim 13, wherein said second amount of said electrolyte is not impregnated within said separator means and said second and third separator means.

19. The electrochromic display cell set forth in claim 13, wherein said third separator means comprises a filter said filter comprising a material selected from the group consisting of asbestos, a glass fibre, an olefin non-woven fabric and an olefin non-woven mat.

20. The electrochromic display cell set forth in claim 13, wherein said third separator means comprises a filter, said filter comprises a material selected from the group consisting of asbestos, a glass fibre, an olefin non-woven fabric and an olefin non-woven mat.

21. The electrochromic display cell set forth in claim 17, wherein said second separator means is smaller in size relative to said porous separator means, said second separator means in conjunction with said porous separator means defining a cut-away portion, said bubble being concealed within said cutaway portion.

22. An electrochromic display cell, comprising:
first electrode means having a display area disposed thereon and a second electrode means,
said first and second electrode means defining a cavity therebetween;
an electrolyte disposed in said cavity, said electrolyte defining a bubble therein;
porous separator means occupying a portion of said cavity and in contact with said first and second electrode means for preventing said bubble from moving toward said display area of said first electrode means, said porous separator means being impregnated with a first amount of said electrolyte,
a second amount of said electrolyte being disposed in the substantial balance of said cavity and defining said bubble therein,
said bubble having a volume which is greater than the additional volume required to compensate for the cubic expansion rate of said second amount of said electrolyte when subjected to increases in temperature.

23. An electrochromic display cell set forth in claim 22, wherein said porous separator means is shaped along its outer periphery to provide a cut-away portion, said bubble being concealed within said cut-away portion of said porous separator means.

24. An electrochromic display cell as set forth in claim 23, wherein said porous separator means comprises a material having elastic characteristics.

25. An electrochromic display cell set forth in claim 24, wherein said porous separator means comprises a filter, said filter further comprising a material selected from the group consisting of asbestos, a glass fibre, a non-woven fabric, a mat of an olefin, and a porous gum plate.

* * * * *

UNITED STATES PATENT AND TRADEMARK OFFICE
CERTIFICATE OF CORRECTION

PATENT NO. : 4,310,220
DATED : January 12, 1982
INVENTOR(S) : Kuwagaki et al

It is certified that error appears in the above—identified patent and that said Letters Patent is hereby corrected as shown below:

On The Title Page,
In the category "[75] Inventors", change

"Hiroshi Nakauchi; Yasuhiko Inami, both of Tenri"

to --Hiroshi Take, Ikoma; Yasuhiko Inami, Tenri--

Signed and Sealed this

Eleventh Day of May 1982

[SEAL]

Attest:

GERALD J. MOSSINGHOFF

Attesting Officer     Commissioner of Patents and Trademarks